United States Patent
Okita

(10) Patent No.: US 10,303,368 B2
(45) Date of Patent: May 28, 2019

(54) STORAGE DEVICE THAT DETERMINES DATA ATTRIBUTES BASED ON CONTINUITY OF ADDRESS RANGES

(71) Applicant: TOSHIBA MEMORY CORPORATION, Tokyo (JP)

(72) Inventor: Kazuhito Okita, Ota Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 156 days.

(21) Appl. No.: 15/622,855

(22) Filed: Jun. 14, 2017

(65) Prior Publication Data

US 2018/0004416 A1    Jan. 4, 2018

(30) Foreign Application Priority Data

Jun. 14, 2016  (JP) .................................. 2016-118304

(51) Int. Cl.
*G06F 3/06* (2006.01)

(52) U.S. Cl.
CPC ............ *G06F 3/061* (2013.01); *G06F 3/0659* (2013.01); *G06F 3/0679* (2013.01); *G06F 3/0688* (2013.01)

(58) Field of Classification Search
CPC ...... G06F 3/061; G06F 3/0679; G06F 3/0659; G06F 3/0688
See application file for complete search history.

(56) References Cited

U.S. PATENT DOCUMENTS

| | | | |
|---|---|---|---|
| 8,671,258 B2 | 3/2014 | Stenfort | |
| 2008/0235437 A1* | 9/2008 | Gorobets | G06F 12/0246 711/103 |
| 2008/0235439 A1* | 9/2008 | So | G06F 12/0246 711/103 |
| 2008/0235463 A1* | 9/2008 | Traister | G06F 12/0246 711/154 |
| 2014/0181327 A1 | 6/2014 | Cohen et al. | |
| 2014/0237170 A1 | 8/2014 | Okita | |

* cited by examiner

*Primary Examiner* — Francisco A Grullon
(74) *Attorney, Agent, or Firm* — Kim & Stewart LLP

(57) ABSTRACT

A storage device includes a nonvolatile memory including a plurality of blocks, and a controller. The controller is configured to retain a logical address range designated by each of a plurality of write commands that were received, and upon each gap of two adjacent logical address ranges of two or more of the write commands being smaller than a first threshold and an entire length of the logical address ranges of said two or more write commands being larger than a second threshold, write data corresponding to one of said two or more write commands in one of the blocks of the nonvolatile memory, as a part of a single data group comprising data corresponding to each of said two or more write commands, such that data that do not form the single data group are not written in said one of the blocks of the nonvolatile memory.

19 Claims, 20 Drawing Sheets

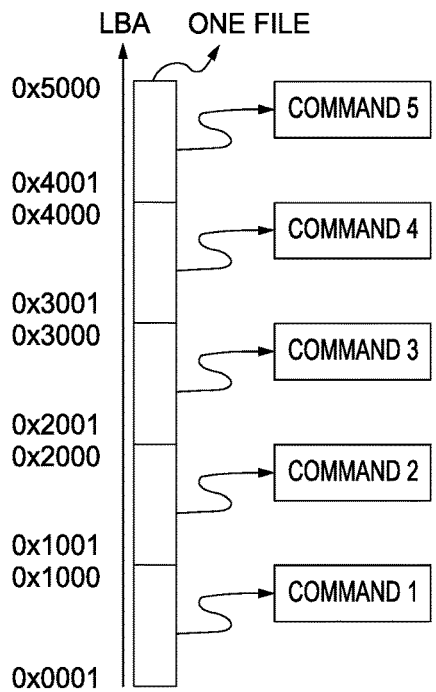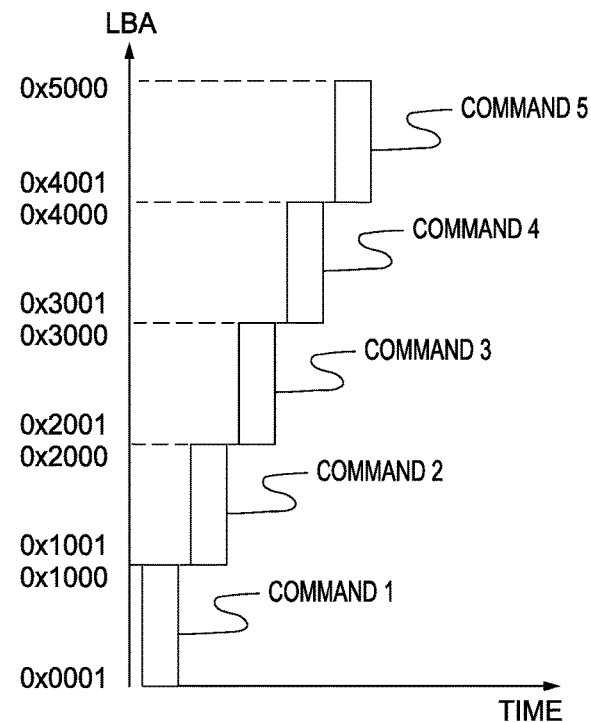
FIG. 3A                FIG. 3B
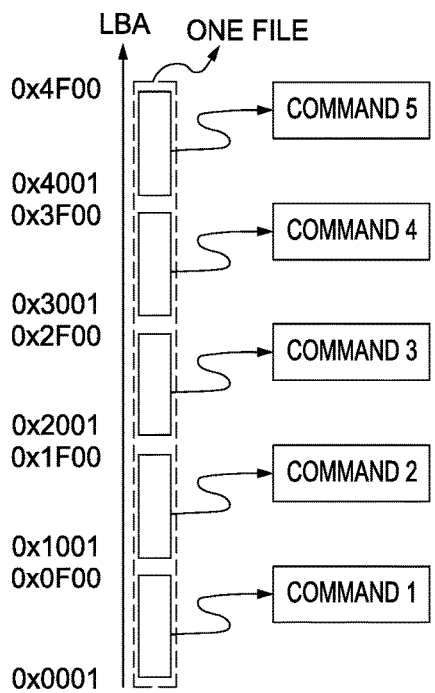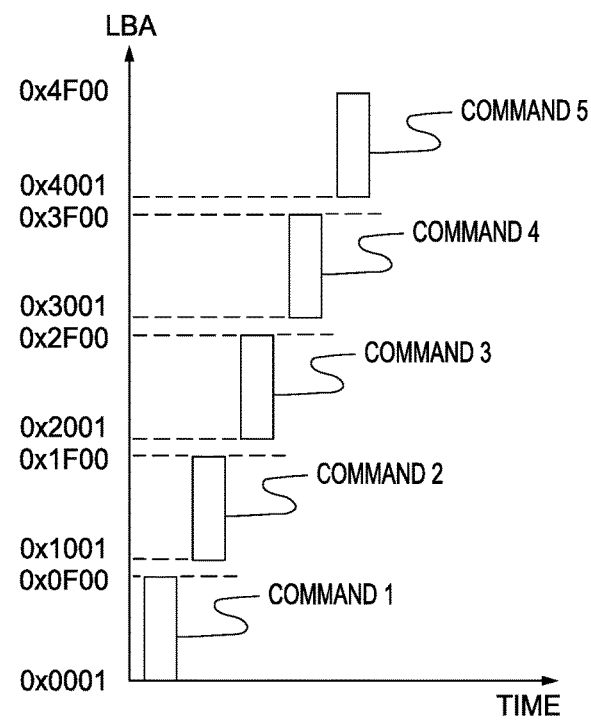
FIG. 4A                FIG. 4B

SEQUENTIAL COMMAND MANAGEMENT TABLE    332

| No. | START LBA | LAST LBA | ACCUMULATED NUMBER | SAME FILE DETERMINATION FLAG |
|---|---|---|---|---|
| 0 | | | | |
| 1 | | | | |
| 2 | | | | |
| 3 | | | | |
| ⋮ | | | | |
| N | | | | |

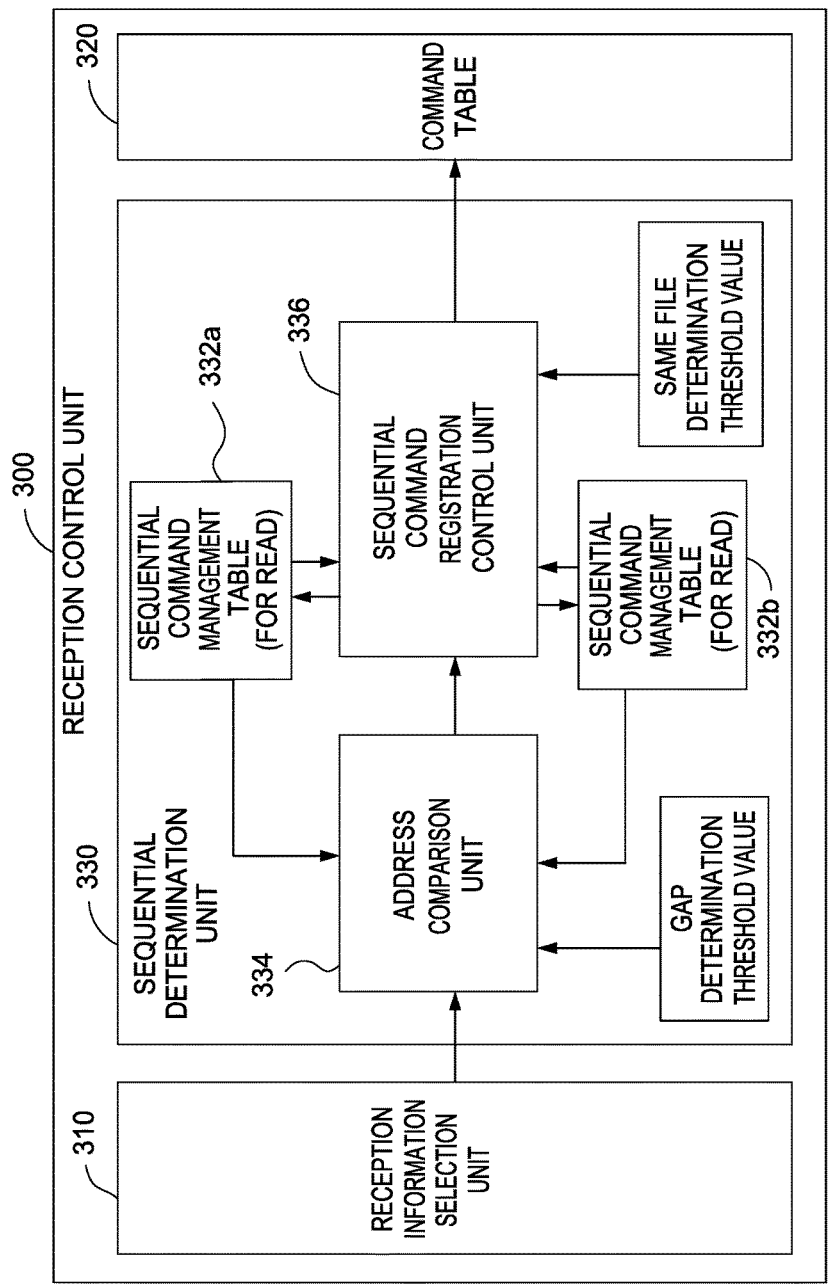

| | 1020 | | 1000 | | | | | | | | | | | | | | 1030 | | | | |
|---|---|---|---|---|---|---|---|---|---|---|---|---|---|---|---|---|---|---|---|---|---|
| | | | | | | | | LOGICAL PAGE | | | | | | | | | | | | | |
| CH 0 | 0 | 18 | 36 | 54 | 72 | 90 | 108 | 126 | 144 | 162 | 180 | 198 | 216 | 234 | 252 | 270 |
| CH 1 | 1 | 19 | 37 | 55 | 73 | 91 | 109 | 127 | 145 | 163 | 181 | 199 | 217 | 235 | 253 | 271 |
| CH 2 | 2 | 20 | 38 | 56 | 74 | 92 | 110 | 128 | 146 | 164 | 182 | 200 | 218 | 236 | 254 | 272 |
| CH 3 | 3 | 21 | 39 | 57 | 75 | 93 | 111 | 129 | 147 | 165 | 183 | 201 | 219 | 237 | 255 | 273 |
| CH 4 | 4 | 22 | 40 | 58 | 76 | 94 | 112 | 130 | 148 | 166 | 184 | 202 | 220 | 238 | 256 | 274 |
| CH 5 | 5 | 23 | 41 | 59 | 77 | 95 | 113 | 131 | 149 | 167 | 185 | 203 | 221 | 239 | 257 | 275 |
| CH 6 | 6 | 24 | 42 | 60 | 78 | 96 | 114 | 132 | 150 | 168 | 186 | 204 | 222 | 240 | 258 | 276 |
| CH 7 | 7 | 25 | 43 | 61 | 79 | 97 | 115 | 133 | 151 | 169 | 187 | 205 | 223 | 241 | 259 | 277 |
| CH 8 | 8 | 26 | 44 | 62 | 80 | 98 | 116 | 134 | 152 | 170 | 188 | 206 | 224 | 242 | 260 | 278 |
| CH 9 | 9 | 27 | 45 | 63 | 81 | 99 | 117 | 135 | 153 | 171 | 189 | 207 | 225 | 243 | 261 | 279 |
| CH 10 | 10 | 28 | 46 | 64 | 82 | 100 | 118 | 136 | 154 | 172 | 190 | 208 | 226 | 244 | 262 | 280 |
| CH 11 | 11 | 29 | 47 | 65 | 83 | 101 | 119 | 137 | 155 | 173 | 191 | 209 | 227 | 245 | 263 | 281 |
| CH 12 | 12 | 30 | 48 | 66 | 84 | 102 | 120 | 138 | 156 | 174 | 192 | 210 | 228 | 246 | 264 | 282 |
| CH 13 | 13 | 31 | 49 | 67 | 85 | 103 | 121 | 139 | 157 | 175 | 193 | 211 | 229 | 247 | 265 | 283 |
| CH 14 | 14 | 32 | 50 | 68 | 86 | 104 | 122 | 140 | 158 | 176 | 194 | 212 | 230 | 248 | 266 | 284 |
| CH 15 | 15 | 33 | 51 | 69 | 87 | 105 | 123 | 141 | 159 | 177 | 195 | 213 | 231 | 249 | 267 | 285 |
| CH 16 | 16 | 34 | 52 | 70 | 88 | 106 | 124 | 142 | 160 | 178 | 196 | 214 | 232 | 250 | 268 | 286 |
| CH 17 | 17 | 35 | 53 | 71 | 89 | 107 | 125 | 143 | 161 | 179 | 197 | 215 | 233 | 251 | 269 | 287 |

FIG. 15

STORAGE DEVICE THAT DETERMINES DATA ATTRIBUTES BASED ON CONTINUITY OF ADDRESS RANGES

CROSS-REFERENCE TO RELATED APPLICATION

This application is based upon and claims the benefit of priority from Japanese Patent Application No. 2016-118304, filed Jun. 14, 2016, the entire contents of which are incorporated herein by reference.

FIELD

Embodiments described herein relate generally to a storage device.

BACKGROUND

Storage devices are desired to have high reliability and improved read write performance.

DESCRIPTION OF THE DRAWINGS

FIG. 3A and FIG. 3B illustrate an example of commands received by the storage device according to the first embodiment.

FIG. 4A and FIG. 4B illustrate another example of commands received by the storage device according to the first embodiment.

FIG. 11 is a block diagram of the sequential determination unit according to the first embodiment.

FIG. 12 illustrates a structure of a command table according to the first embodiment.

FIG. 15 illustrates a configuration of a logical page according to the second embodiment.

DETAILED DESCRIPTION

An embodiment is directed to improving performance of a storage device.

In general, according to an embodiment, a storage device includes a nonvolatile memory including a plurality of blocks, and a controller. The controller is configured to retain a logical address range designated by each of a plurality of write commands that were received, and upon each gap of two adjacent logical address ranges of two or more of the write commands being smaller than a first threshold and an entire length of the logical address ranges of said two or more write commands being larger than a second threshold, write data corresponding to one of said two or more write commands in one of the blocks of the nonvolatile memory, as a part of a single data group comprising data corresponding to each of said two or more write commands, such that data that do not form the single data group are not written in said one of the blocks of the nonvolatile memory.

Hereinafter, a storage device according to embodiments will be described with reference to the drawings. In the description below, the same reference signs will be used for elements having the same functions and configurations.

First Embodiment

Figure 1:
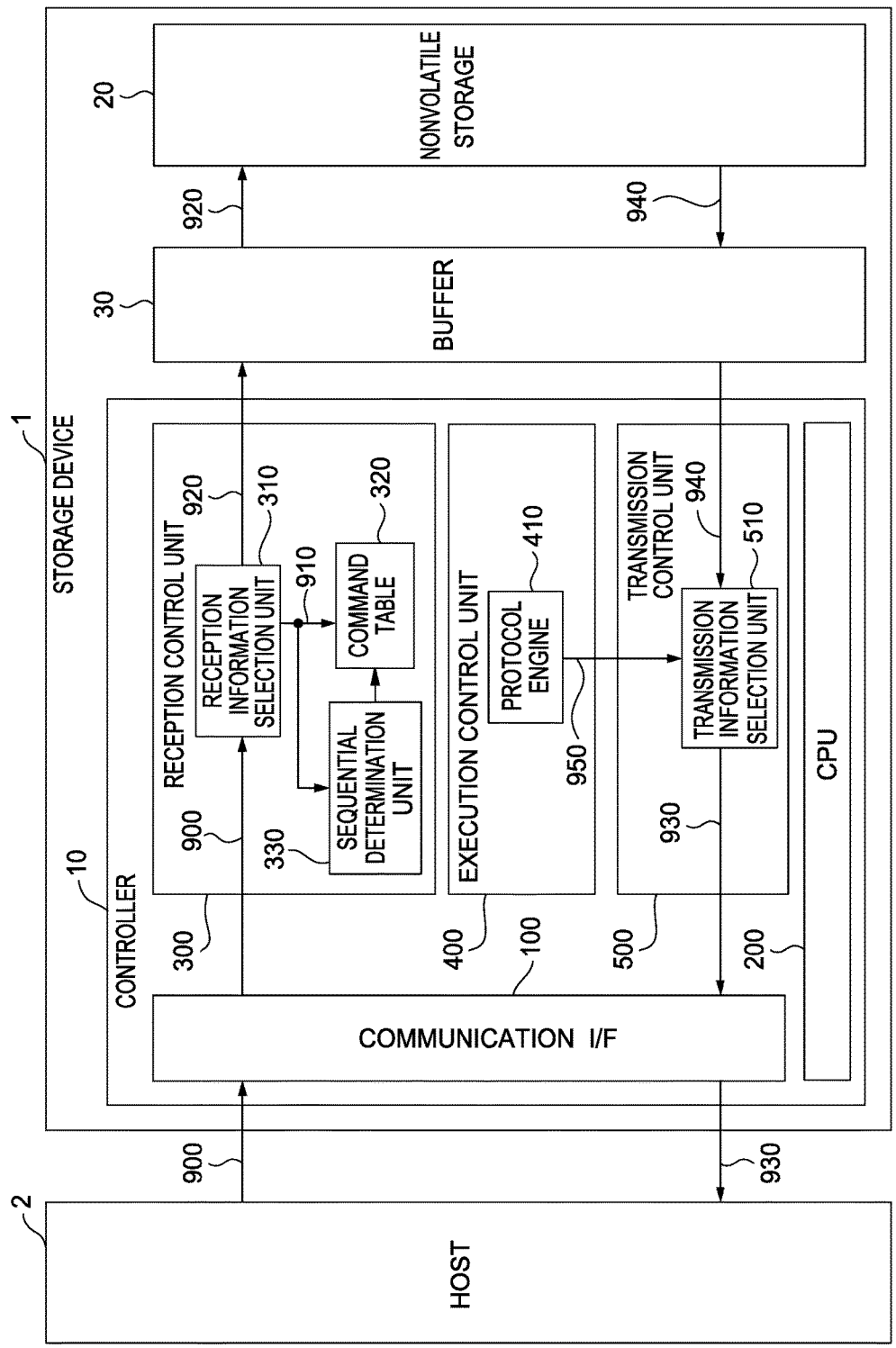
FIG. 1 is a block diagram of a storage device according to a first embodiment.

FIG. 1 is a block diagram of a storage device 1 according to a first embodiment.

The storage device 1 includes a controller 10 that controls the entire storage device 1, a nonvolatile storage 20 for storing data, and a buffer 30 for temporarily storing the data communicated between a host 2 and the nonvolatile storage 20.

In the present embodiment, the host 2 is a computer that supports an interface of a serial attached SCSI (SAS) standard. However, the host 2 may be a computer that supports an interface of, for example, a serial ATA (SATA) standard or an NVM express (registered trademark) (NVMe) standard.

The controller 10 is a semiconductor integrated circuit including, for example, a system on a chip (SoC).

As the nonvolatile storage 20, for example, a NAND-type flash memory or a magnetic disk is used.

The buffer 30 according to the present embodiment is a memory including a dynamic random access memory (DRAM). However, other types of memory such as a static random access memory (SRAM) may be adopted. In addition, the buffer 30 may be integrated in the controller 10.

The controller 10 includes a communication interface (I/F) 100 that performs communication with the host 2, a central processing unit (CPU) 200 that performs overall control of the storage device 1 by executing firmware (FW), a reception control unit 300 that controls reception of information from the host 2, an execution control unit 400 that controls execution of a command received from the host 2, a transmission control unit 500 that controls execution of transmitting information to the host 2, and the like. The CPU 200 may be a semiconductor integrated circuit that is configured separately from the controller 10.

In the description below, a part or all of the functions performed by executing the FW can be performed by dedicated hardware (HW), and a part or all of the functions performed by the HW can be performed by executing the FW.

The reception control unit 300 includes a reception information selection unit 310 that performs sorting of commands and data received from the host 2, a command table 320 in which the received command is stored, a sequential determination unit 330 that determines continuity of addresses designated by the commands, and the like.

The reception information selection unit 310 stores information 900 received in a frame form from the host 2 in a storage destination selected based on a frame type field in a frame header. That is, a COMMAND frame 910, which is command information, is stored in the command table, and a DATA frame 920, which is data to be stored in the nonvolatile storage 20, is stored in the buffer 30, respectively.

The COMMAND frame 910 stored in the command table 320 is read out by the CPU 200 in accordance with the FW, and the CPU 200 interprets types of the command (that is, types of a write command, a read command, or a non-data command), a logical block address (LBA), the number of transfers, and the like.

Details of the operation of the sequential determination unit 330 will be described below.

The execution control unit 400 includes a protocol engine 410 or the like that executes the command with a protocol suitable for the interface.

The transmission control unit 500 includes a transmission information selection unit 510 or the like that performs the sorting of the status information and the data to be transmitted to the host 2.

The transmission information selection unit 510 selects the DATA frame 940, which is the data read from the nonvolatile storage 20 and stored in the buffer 30, and the status information 950 indicating an internal state of the storage device 1 based on an instruction from the execution control unit 400, and outputs the selected DATA frame 940 and the status information 950 to the communication interface 100.

The status information 950 includes a RESPONSE frame indicating that the execution of the command is completed and a XFER_RDY (Transfer Ready) frame indicating that the storage device 1 is ready to receive the write data.

Next, a configuration of a storage system 4 that uses the storage device 1 according to the present embodiment will be described with reference to FIG. 2.

Figure 2:
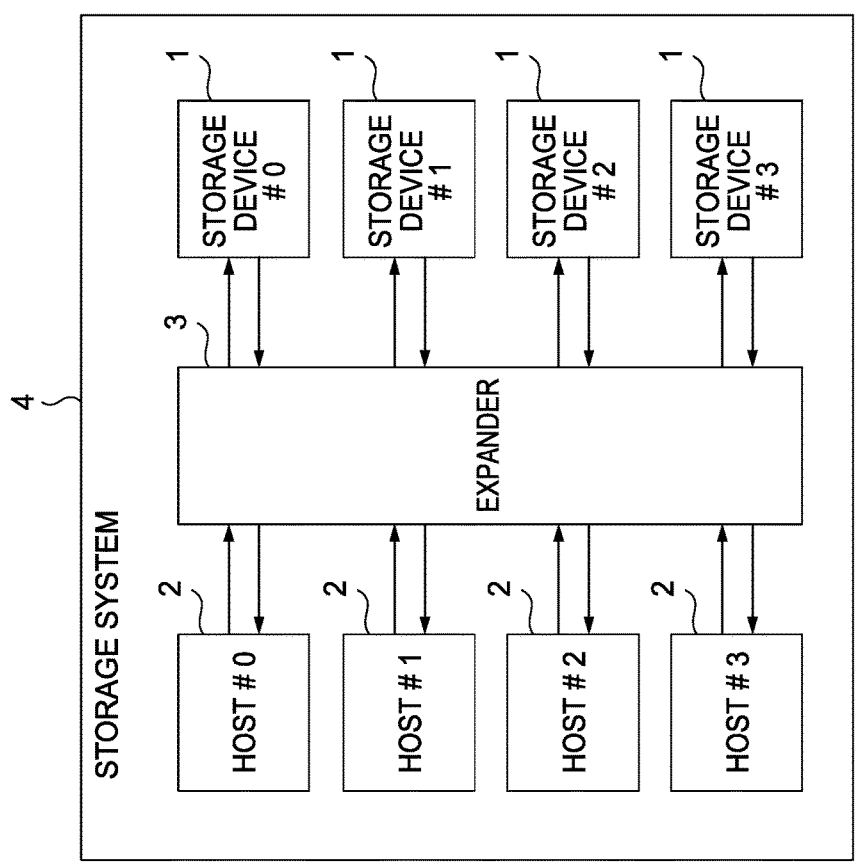
FIG. 2 is a block diagram of a storage system including the storage device according to the first embodiment.

As illustrated in FIG. 2, in the SAS interface, a plurality of storage devices 1 and a plurality of hosts 2 can communicate with each other via a repeater, which is also referred to as an expander 3. Each storage device 1 and each host 2 are distinguished by identifiers called a worldwide name (WWN) uniquely assigned to each storage device 1 and each host 2, respectively.

Next, an example of a command division when data configuring one file is accessed via a plurality of commands will be described with reference to FIG. 3A and FIG. 3B.

As illustrated in FIG. 3A, one file includes data items stored in LBA=0x0001 to 0x5000. In addition, the host 2 uses command 1 to command 5 in order to access (that is, read or write) this file.

At this time, as illustrated in FIG. 3B, the storage device 1 receives five commands: a command 1 that designates LBA=0x0001 to 0x1000, a command 2 that designates LBA=0x1001 to 0x2000, a command 3 that designates LBA=0x2001 to 0x3000, a command 4 that designates LBA=0x3001 to 0x4000, and a command 5 that designates LBA=0x4001 to 0x5000. In these commands, for example, a difference between the last LBA (0x1000) of the command 1 and the start LBA (0x1001) of the command 2 is "1". The storage device 1 recognizes these commands as sequential (continuous) commands.

In the above description, the command designates the start LBA and the last LBA. However, the command may designate the start LBA and the number of transfers (for example, the number of sectors). In this case, the last LBA is calculated as: last LBA=start LBA+the number of transfers−1.

On the other hand, in some cases, depending on an arrangement of the data configuring the file, one file may include a plurality of data items with gap regions between the data items as illustrated in FIG. 4A and FIG. 4B. In FIG. 4A and FIG. 4B, the data items configuring the file is stored in a region except the four gap regions (that is, LBA=0x0F00 to 0x1001, LBA=0x1F00 to 0x2001, LBA=0x2F00 to 0x3001, and LBA=0x3F00 to 0x4001) among the LBA=0x0001 to 0x4F00. The storage device 1 receives the command 1 to command 5 that designate LBA ranges which are separated by these gap regions.

Figures 5A, 5B, 6:
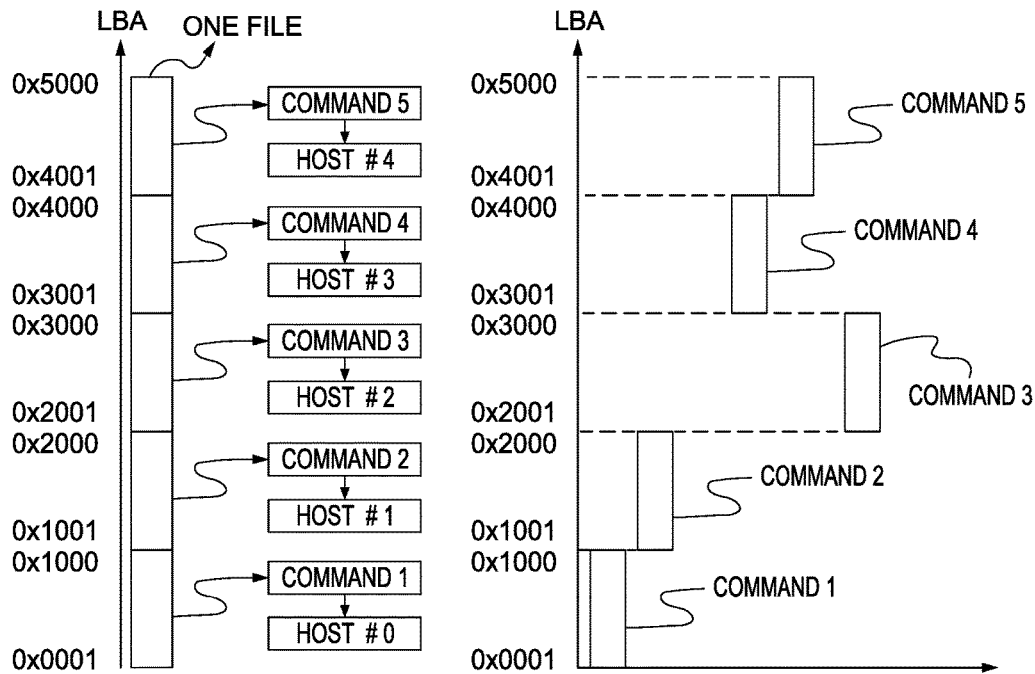
FIG. 5A and FIG. 5B illustrate still another example of commands received by a storage device according to the first embodiment.
FIG. 6 illustrates a structure of a sequential command management table according to the first embodiment.

In addition, when the storage system 4 illustrated in FIG. 2 is used, as illustrated in FIG. 5A and FIG. 5B, in some cases, the data items configuring one file may be accessed via commands issued by the plurality of hosts 2.

In FIG. 5A, a host #0 issues the command 1, a host #1 issues the command 2, a host #2 issues the command 3, a host #3 issues the command 4, and a host #4 issues the command 5 respectively. At this time, since each command from each host 2 passes through the expander 3, an order of receiving the commands by the storage device 1 is not necessarily an order of command 1, command 2, command 3, command 4, and command 5.

For example, as illustrated in FIG. 5B, in some cases, the commands are received in an order of the command 1 (host #0) that designates LBA=0x0001 to 0x1000, the command 2 (host #1) that designates LBA=0x1001 to 0x2000, the command 4 (host #3) that designates the LBA=0x3001 to 0x4000, the command 5 (host #4) that designates LBA=0x4001 to 0x5000, and the command 3 (host #2) that designates LBA=0x2001 to 0x3000.

The storage device 1 according to the present embodiment includes a unit that determines that these commands belong to a series of commands (hereinafter, referred to as a "same file command group") for accessing the data items configuring the same file when the commands illustrated in FIG. 3A to FIG. 5B are received.

Next, a configuration of the sequential command management table 332 will be described with reference to FIG. 6.

The sequential command management table 332 is maintained in the sequential determination unit 330. The sequential command management table 332 includes (N+1) entries and each entry includes the start LBA, the last LBA, an accumulated number, and a same file determination flag. An operation of the sequential determination unit 330 using the sequential command management table 332 will be described below.

Two sequential command management tables 332 for write commands and for read commands are maintained in the present embodiment. In the description below in the present embodiment, it is assumed that all commands are write commands. However, the operation of the sequential determination unit 330 is the same in a case of read commands.

In addition, a register for setting a gap determination threshold value and a same file determination threshold value is formed in the sequential determination unit 330. Those threshold values may be set for each of the write commands and the read commands.

If a difference between the last LBA of a certain command and the start LBA of another command is equal to or smaller than the gap determination threshold value, it is determined that the commands are sequential commands. If this threshold value is "1", only the commands of which difference between the last LBA and the start LBA is "1" as illustrated in FIG. 3A and FIG. 3B are determined to be the sequential commands.

If the accumulated number of the number of transfers of the commands determined to be the sequential commands is equal to or greater than the same file determination threshold value, it is determined that the sequential commands are the commands belong to the same file command group. Details will be described below.

Next, an operation of the sequential determination unit 330 using the sequential command management table 332 will be described with reference to FIG. 7 and FIG. 8.

Figure 7:
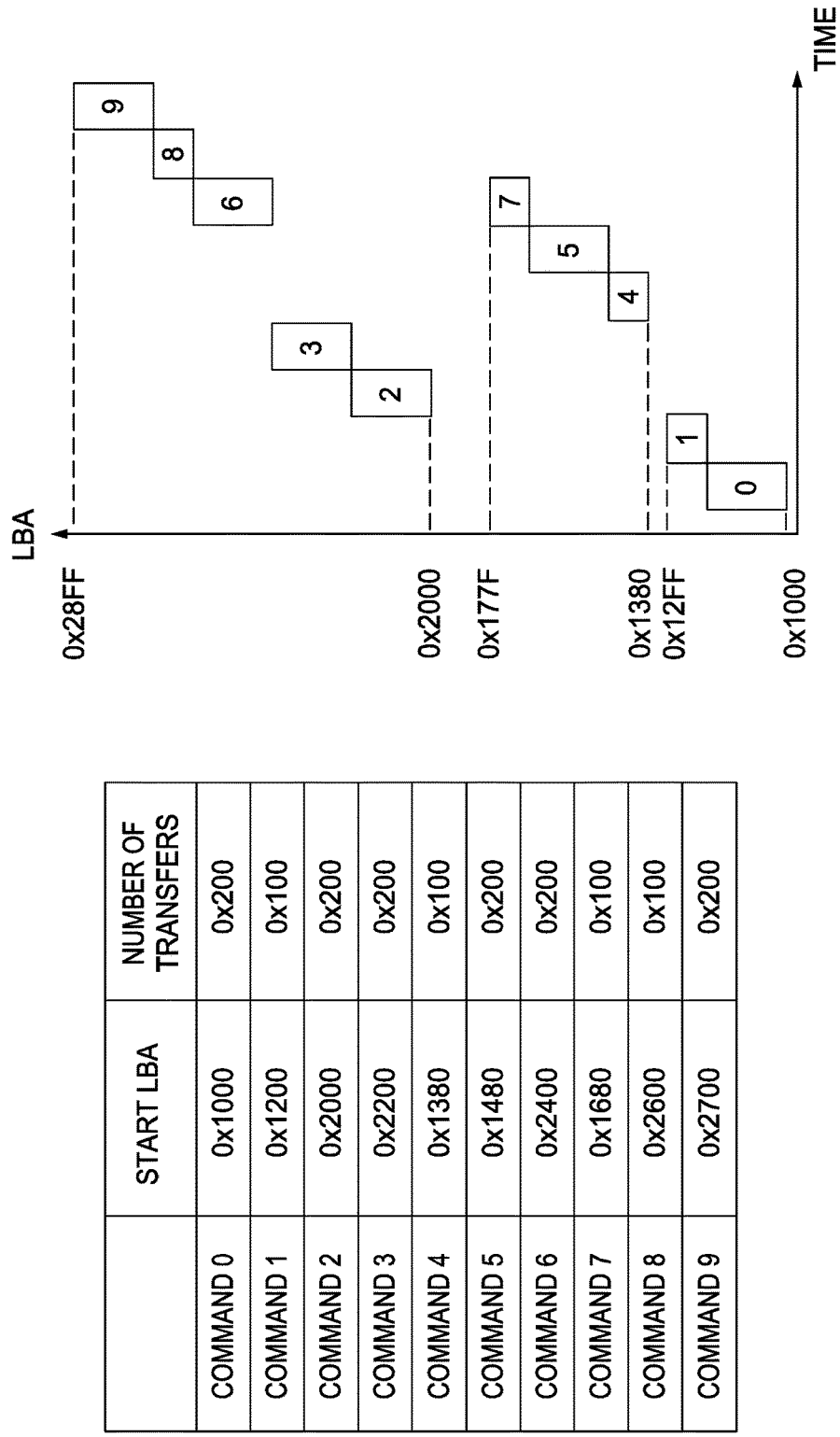
FIG. 7 illustrates another example of commands received by the storage device according to the first embodiment.
Figure 8:
FIG. 8A to FIG. 8K illustrate data set in the sequential command management table according to an operation of a sequential determination unit according to the first embodiment.

FIG. 7 illustrates an example of a series of commands received by the storage device 1.

In FIG. 7, the storage device 1 receives the command 0 having the number of transfers=0x200 sectors at the start LBA=0x1000, the command 1 having the number of transfers=0x100 sectors at the start LBA=0x1200, the command 2 having the number of transfers=0x200 sectors at the start LBA=0x2000, the command 3 having the number of transfers=0x200 sectors at the start LBA=0x2200, the command 4 having the number of transfers=0x100 sectors at the start LBA=0x1380, the command 5 having the number of transfers=0x200 sectors at the start LBA=0x1480, the command 6 having the number of transfers=0x200 sectors at the start LBA=0x2400, the command 7 having the number of transfers=0x100 sectors at the start LBA=0x1680, the command 8 having the number of transfers=0x100 sectors at the start LBA=0x2600, and the command 9 having the number of transfers=0x200 sectors at the start LBA=0x2700, in this order.

FIG. 8A to FIG. 8K illustrate states of the sequential command management table 332 when the command 0 to command 9 illustrated in FIG. 7 are received, respectively. Here, only two entries of entry 0 and entry 1 are illustrated. In addition, it is assumed that the gap determination threshold value is 0x100 and the same file determination threshold value is 0x500.

FIG. 8A illustrates a state before anyone of the commands are received. Valid values are not registered in any of the start LBA, the last LBA, the accumulated number, and the same file determination flag.

FIG. 8B illustrates a state after the command 0 is received. The start LBA and the last LBA=start LBA+the number of transfers−1 of the command 0 are registered in the entry 0. In addition, the number of transfers (0x200) of the command 0 is registered in the accumulated number.

FIG. 8C illustrates a state after the command 1 is received. The difference (0x1200−0x11FF=0x0001) between the start LBA of the command 1 and the last LBA registered in the entry 0 is equal to or smaller than the gap determination threshold value. For that reason, it is determined that the command 1 hits the entry 0, that is, the command 1 is sequential to the command registered in the entry 0. Thus, the start LBA and the last LBA of the command 1 are registered in the entry 0. In addition, the accumulated number of the entry 0 becomes the number 0x300, which is obtained by adding the number of transfers (0x100) of the command 1 to the value (0x200) which is the accumulated number before receiving the command 1.

FIG. 8D illustrates a state after the command 2 is received. The difference (0x2000−0x12FF=0x0D01) between the start LBA of the command 2 and the last LBA registered in the entry 0 is greater than the gap determination threshold value. For that reason, it is determined that the command 2 does not hit the entry 0. Therefore, the start LBA and the last LBA of the command 2 are registered in the entry 1. In addition, the number of transfers (0x200) is registered in the accumulated number of the entry 1.

FIG. 8E illustrates a state after the command 3 is received. The difference (0x2200−0x21FF=0x0001) between the start LBA of the command 3 and the last LBA registered in the entry 1 is equal to or smaller than the gap determination threshold value. For that reason, it is determined that the command 3 hits the entry 1, and thus, the start LBA and the last LBA of the command 3 are registered in the entry 1. In addition, the accumulated number of the entry 1 becomes the number 0x400, which is obtained by adding the number of transfers (0x200) of the command 3 to the value (0x200) which is the accumulated number before receiving the command 3.

FIG. 8F illustrates a state after the command 4 is received. The difference (0x1380−0x12FF=0x0081) between the start LBA of the command 4 and the last LBA registered in the entry 0 is equal to or smaller than the gap determination threshold value. For that reason, it is determined that the command 4 hits the entry 0, and thus, the start LBA and the last LBA of the command 4 are registered in the entry 0. In addition, the accumulated number of the entry 0 becomes the number 0x400, which is obtained by adding the number of transfers (0x100) of the command 4 to the value (0x300) which is the accumulated number before receiving the command 4.

FIG. 8G illustrates a state after the command 5 is received. The difference (0x1480−0x147F=0x0001) between the start LBA of the command 5 and the last LBA registered in the entry 0 is equal to or smaller than gap determination threshold value. For that reason, it is determined that the command 5 hits the entry 0, and thus, the start LBA and the last LBA of the command 5 are registered in the entry 0. In addition, the accumulated number of the entry 0 becomes the number 0x600, which is obtained by adding the number of transfers (0x200) of the command 5 to the value (0x400) which is the accumulated number before receiving the command 5. Since the accumulated number of the entry 0 becomes equal to or greater than the same file determination threshold value, the same file determination flag of the entry 0 is set.

FIG. 8H illustrates a state after the command 6 is received. The difference (0x2400−0x23FF=0x0001) between the start LBA of the command 6 and the last LBA registered in the entry 1 is equal to or smaller than the gap determination threshold value. For that reason, it is determined that the command 6 hits the entry 1, and thus, the start LBA and the last LBA of the command 6 are registered in the entry 1. In addition, the accumulated number of the entry 1 becomes the number 0x600, which is obtained by adding the number of transfers (0x200) of the command 6 to the value (0x400) which is the accumulated number before receiving the command 6. Since the accumulated number of the entry 1 becomes equal to or greater than the same file determination threshold value, the same file determination flag of the entry 1 is set.

FIG. 8I illustrates a state after the command 7 is received. The difference (0x1680−0x167F=0x0001) between the start LBA of the command 7 and the last LBA registered in the entry 0 is equal to or smaller than the gap determination threshold value. For that reason, it is determined that the command 7 hits the entry 0, and thus, the start LBA and the last LBA of the command 7 are registered in the entry 0. In addition, the accumulated number of the entry 0 becomes the number 0x700, which is obtained by adding the number of transfers (0x100) of the command 7 to the value (0x600) which is the accumulated number before receiving the command 7.

FIG. 8J illustrates a state after the command 8 is received. The difference (0x2600−0x25FF=0x0001) between the start LBA of the command 8 and the last LBA registered in the entry 1 is equal to or smaller than the gap determination threshold value. For that reason, it is determined that the command 8 hits the entry 1, and thus, the start LBA and the last LBA of the command 8 are registered in the entry 1. In addition, the accumulated number of the entry 1 becomes the number 0x700, which is obtained by adding the number of transfers (0x100) of the command 8 to the value (0x600) which is the accumulated number before receiving the command 8.

FIG. 8K illustrates a state after the command 9 is received. The difference (0x2700−0x26FF=0x0001) between the start LBA of the command 9 and the last LBA registered in the entry 1 is equal to or smaller than the gap determination threshold value. For that reason, it is determined that the command 9 hits the entry 1, and thus, the start LBA and the last LBA of the command 9 are registered in the entry 1. In addition, the accumulated number of the entry 1 becomes the number 0x900, which is obtained by adding the number of transfers (0x200) of the command 9 to the value (0x700) which is the accumulated number before receiving the command 9.

If the number of transfers of the commands that hit the entries is continuously added to the accumulated number, a counter that records the accumulated number may overflow. In order to prevent the overflow, it is preferable that the entry in which the same file determination flag is set updates only the start LBA and the last LBA and holds the accumulated number.

In addition, in a situation that the valid values are registered in all entries of the sequential command management table 332, if the received command does not hit any one of the entries, the command information may be registered in the entry of which accumulated number is the smallest.

Figure 9:
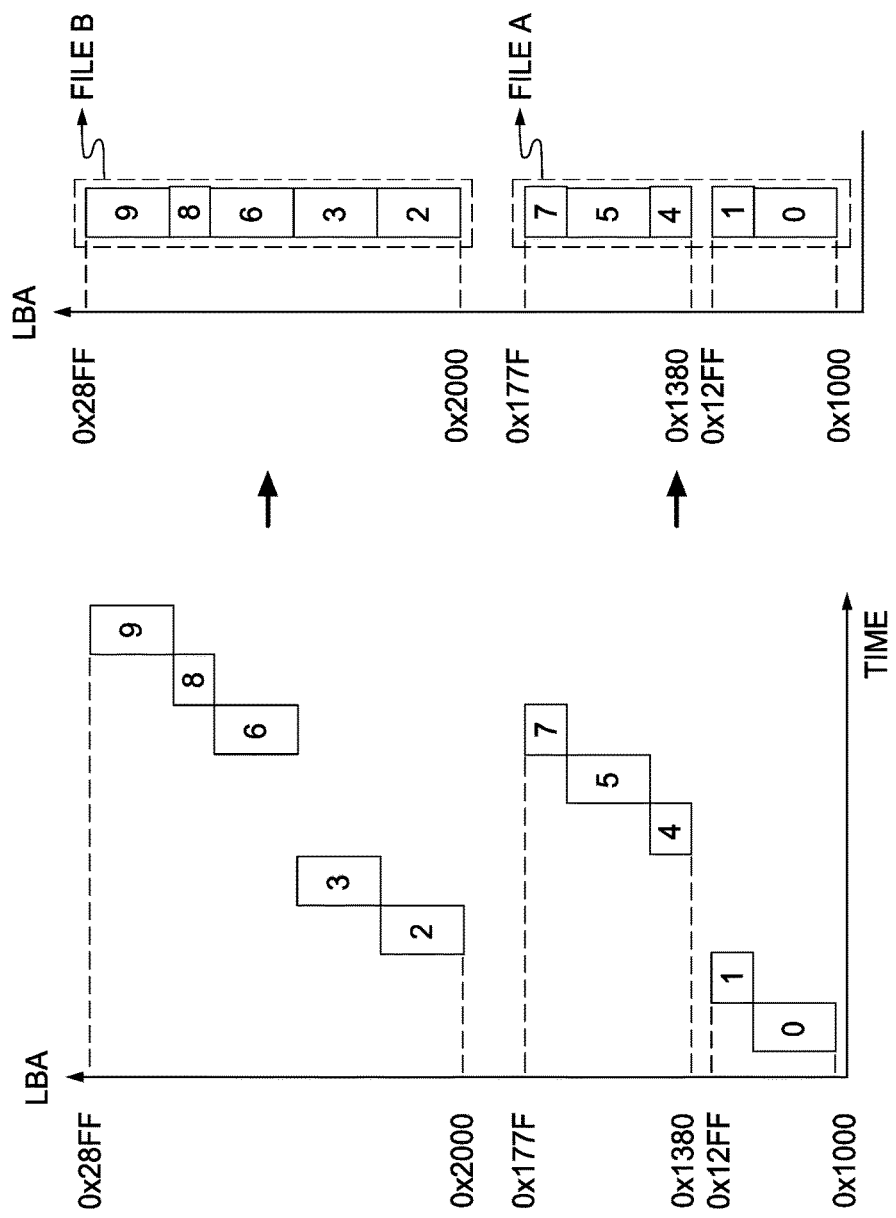
FIG. 9 illustrates determination of the same file command group determined by the storage device according to the first embodiment.

FIG. 9 illustrates determination of the same file command group using the sequential command management table 332.

The storage device 1 determines that the command 0, command 1, command 4, command 5, and command 7 are a series of commands for accessing the data configuring a file A and the command 2, command 3, command 6, command 8, and command 9 are a series of commands for accessing the data configuring a file B.

Figure 10:
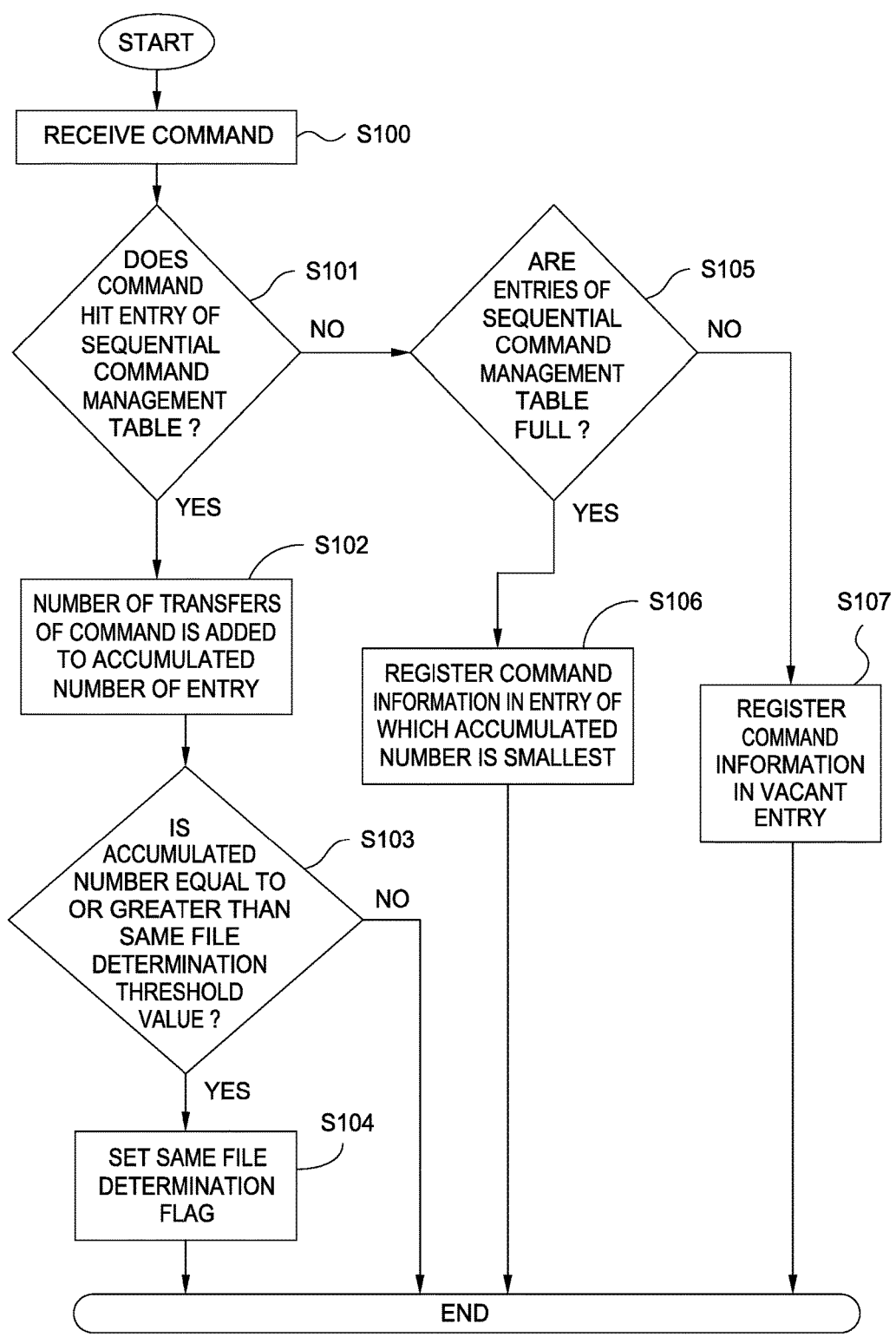
FIG. 10 is a flowchart illustrating an operation of the sequential determination unit according to the first embodiment.

Next, an operation of the sequential determination unit 330 at the time of receiving the command will be described with reference to FIG. 10.

When a notification of receiving the command is received from the reception information selection unit 310 (S100), the sequential determination unit 330 determines whether or not the command hits the entry of the sequential command management table 332, that is, whether or not the difference between the start LBA of the received command and the last LBA of any one of the effective entries is equal to or smaller than the gap determination threshold value (S101). When the command hits the entry (Yes in S101), the number of transfers of commands is added to the accumulated number of the entry (S102). When the accumulated number is equal to or greater than the same file determination threshold value (Yes in S103), the same file determination flag is set for the entry (S104).

On the other hand, when the received command does not hit anyone of the entries of the sequential command management table 332 (No in S101), the sequential determination unit 330 determines whether or not the valid values are set in all entries of the sequential command management table 332, that is, whether or not the entries are full (S105). When the entries are full (Yes in S105), the command information is registered in the entry of which accumulated number is the smallest (S106). When the entries are not full (No in S105), the command information is registered in the entry in which the valid value is not set (S107).

Next, a detailed configuration of the sequential determination unit 330 will be described with reference to FIG. 11.

The sequential determination unit 330 includes a sequential command management table 332*a* for write commands, a sequential command management table 332*b* for read commands, an address comparison unit 334, a sequential command registration control unit 336, and the like.

The address comparison unit 334 determines whether or not the received command hits any one of the entries of the sequential command management table 332*a* for the write commands or the sequential command management table 332*b* for the read commands based on the information of the received command (types such as the read command and the write command, start LBA, and the number of transfers) input from the reception information selection unit 310 and the gap determination threshold value.

The sequential command registration control unit 336 registers the received command information in the appropriate entry of the sequential command management table 332*a* for the write commands or the sequential command management table 332*b* for the read commands based on the hit information determined by the address comparison unit 334 and the same file determination threshold value. In addition, the value of the same file determination flag and an entry number of the sequential command management table 332 in which the same file determination flag is set are output to the command table 320.

Next, a configuration of the command table 320 will be described with reference to FIG. 12.

The command table 320 includes 4 DWs (double word, 1 DW is 32 bits) per one entry, and is implemented with the number of entries corresponding to the number of commands (for example, 256) to be queued.

The start LBA is stored in DW0 and DW1 and the number of transfers is stored in DW2 of each entry. In addition, a tag, types of the command (types such as the write command, read command, non-data command), the same file determination flag and other various flags for control, and the file ID are stored in DW3.

The tag is an identifier of each command to be queued and executed.

The file ID is an identifier indicating which file includes data to be accessed by the command stored in the entry of the command table 320 with the same file determination flag, and the entry number of the sequential command management table 332 output from the sequential determination unit 330 is used as the file ID.

The CPU 200 extracts the COMMAND frame from the command table 320 and appropriately controls the execution of the command using the flags. Especially, when the same file determination flag is set, the appropriate controls can be performed, assuming that the command is a command to access the data configuring the same file.

As described above, the storage device according to the first embodiment determines that the command accesses the data configuring the same file based on the LBA range of the received command. Therefore, the execution of the command can be appropriately controlled, and thus, it is possible to improve the performance of the storage device.

Second Embodiment

The storage device according to the first embodiment determines whether or not the command belongs to the same file command group based on the LBA range of the received command. The storage device according to a second embodiment is further directed to improving the performance of the storage device by changing the control of executing the write command belonging to the same file command group.

Figure 13:
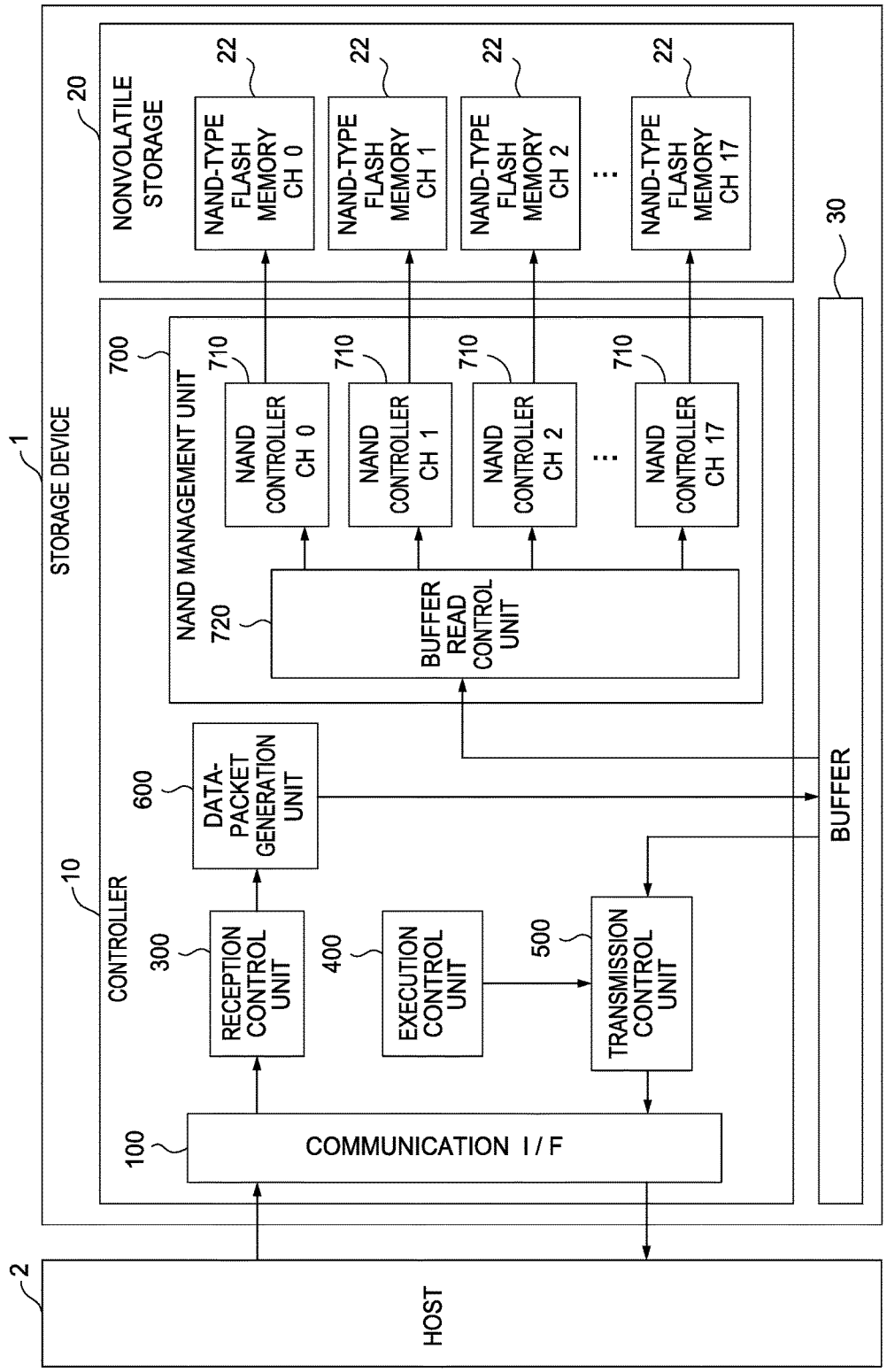
FIG. 13 is a block diagram of a storage device according to a second embodiment.

FIG. 13 is a block diagram of the storage device 1 according to the second embodiment. In the description below, the description for a functional block necessary for reading the data from the nonvolatile storage 20 is omitted.

The nonvolatile storage 20 according to the present embodiment is a NAND-type flash memory 22. The nonvolatile storage 20 may be other type of nonvolatile semiconductor memory such as a NOR-type flash memory or a magnetoresistive random access memory (MRAM). In addition, the nonvolatile storage 20 includes 18-channel (Ch) NAND-type flash memories 22, which are referred to as NAND-type flash memories Ch0 to Ch17. The number of channels may be more than or less than 18.

In addition to the configuration of the controller 10 according to the first embodiment, the controller 10 according to the present embodiment includes a data packet generation unit 600 that processes the data stored in the buffer 30 into the data packet form and a NAND management unit 700 that controls the writing of the data into the NAND-type flash memory 22.

The NAND management unit 700 is connected to each of the NAND-type flash memories Ch0 to Ch17 and includes NAND controllers 710 (hereinafter, referred to as NAND controllers Ch0 to Ch17) each of which controls an operation of writing, reading, erasing into and from a corresponding NAND-type flash memory 22, and a buffer read control unit 720 that transfers the data packet read from the buffer 30 to the NAND controllers 710.

Next, the configuration of the physical page 1000 and the physical block 1010 in the NAND-type flash memory 22 according to the present embodiment will be described with reference to FIGS. 14A and 14B.

Figure 14A:
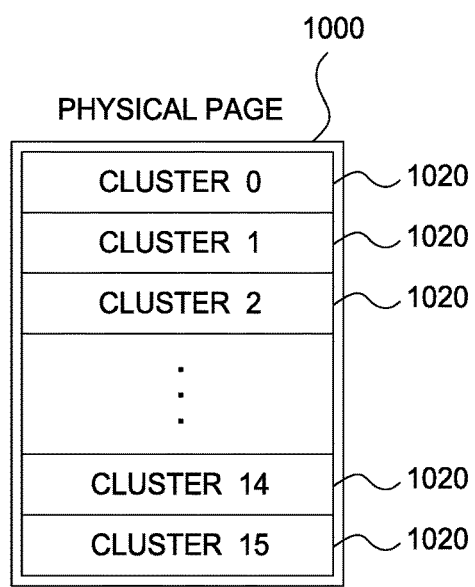
FIG. 14A and FIG. 14B illustrate configurations of a physical page and a physical block according to the second embodiment.

As illustrated in FIG. 14A, a minimum management unit in the reading and writing of the data from and into the NAND-type flash memory 22 is called as a cluster 1020. The size of the cluster 1020 according to the present embodiment is 4 kB. In addition, a minimum circuit configuration unit capable of reading and writing of the data from and into the NAND-type flash memory 22 in one time is referred to as the physical page 1000. The size of the physical page 1000 according to the present embodiment is 16 clusters (4 kB×16 clusters=64 kB).

Figure 14B:
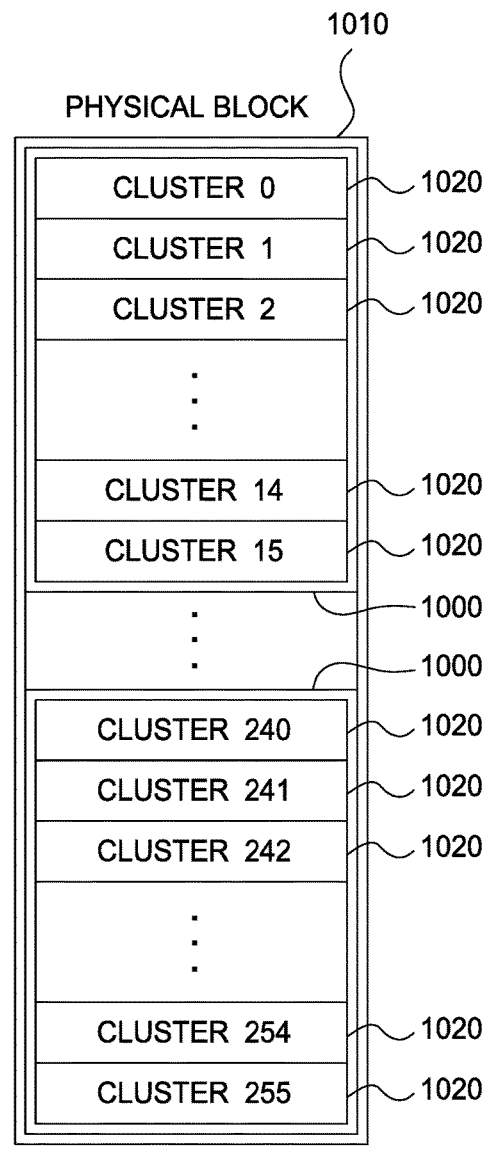

In addition, as illustrated in FIG. 14B, a minimum circuit configuration unit for erasing data in the NAND-type flash memory 22 is referred to as a physical block 1010. The size of the physical block 1010 according to the present embodiment is 256 clusters, that is, 16 physical pages (64 kB×16 physical pages=1024 kB). The sizes of each of the units are examples, and are not limited to these values. In addition, in order to extend the life of the NAND-type flash memory 22, it is desirable to reduce the number of erasures as much as possible.

Single physical page 1000 never extends over two or more physical blocks 1010. That is, data written in one physical page 1000 are erased at once.

Next, a configuration of a logical page 1030 which is a unit according to which the controller 10 according to the present embodiment reads and writes data in the nonvolatile storage 20 will be described with reference to FIG. 15.

One square in FIG. 15 indicates the cluster 1020. A number called media cluster offset (hereinafter, referred to as MCO) is assigned to each cluster 1020, and positions of each cluster 1020 in the logical page 1030 are specified by the MCO.

In addition, one row in a horizontal direction (16 clusters) corresponding to each NAND-type flash memory 22 is the physical page 1000. That is, a size of the logical page 1030 according to the present embodiment is 18 physical pages.

Next, a configuration of a logical block 1040 which is a unit for the controller 10 according to the present embodiment to erase the data in the nonvolatile storage 20 will be described with reference to FIG. 16A and FIG. 16B.

Figure 16A:
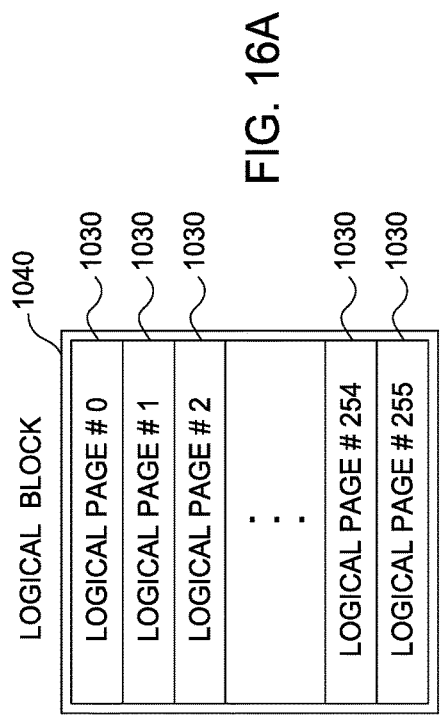
FIG. 16A and FIG. 16B illustrate a configuration of a logical block according to the second embodiment.

As illustrated in FIG. 16A, in the present embodiment, the size of the logical block 1040 is 256 logical pages. All clusters of each NAND-type flash memory 22 can be uniquely specified by a logical block number, a logical page number, and the MCO.

Figure 16B:
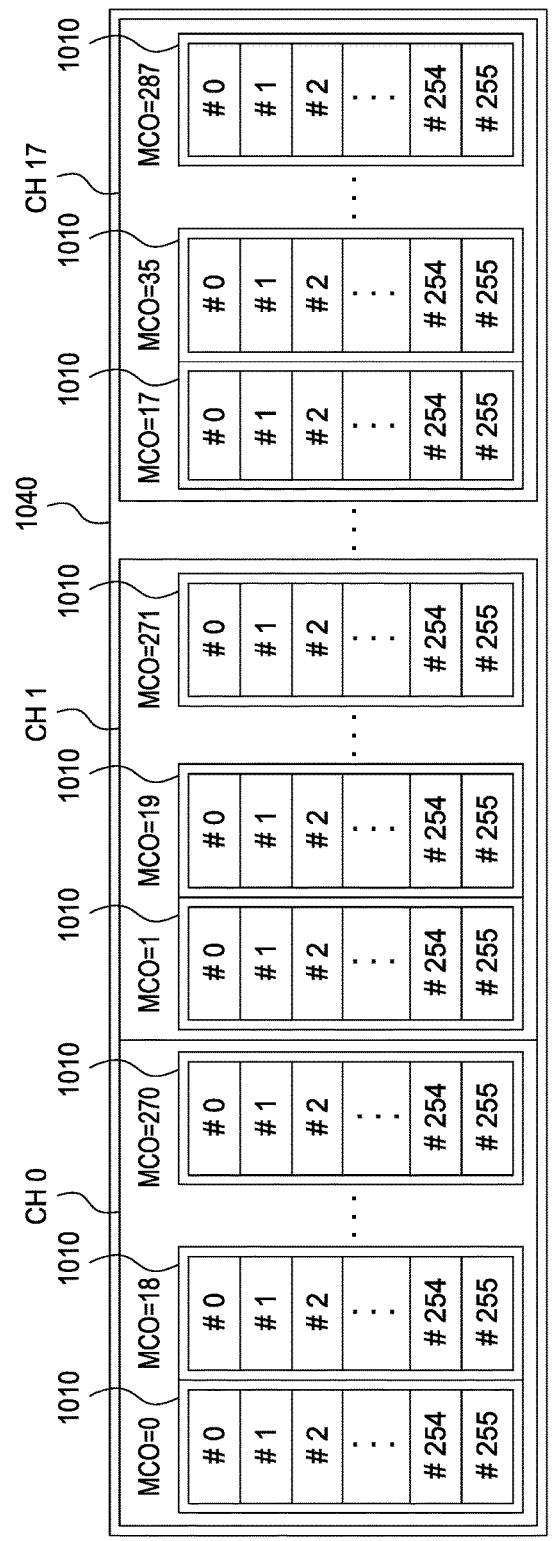

In addition, as illustrated in FIG. 16B, a set of clusters 1020 having the same MCO in the logical block 1040 becomes the physical block 1010. For example, a set of MCO=0 of the logical page#0 to logical page#255 forms one physical block 1010 of the NAND-type flash memory Ch0, and a set of MCO=18 forms another one physical block 1010 of the NAND-type flash memory Ch0. Similarly, a set of MCO=1 forms one physical block 1010 of the NAND-type flash memory Ch1.

That is, 16 physical blocks of the NAND-type flash memory Ch0 to 16 physical blocks of the NAND-type flash memory Ch17, total 288 physical blocks are included in each logical block 1040. The controller 10 performs the erasure for each logical block 1040, not for each physical block 1010 which is a minimum unit for erasing data in the NAND-type flash memory 22.

Figure 17:
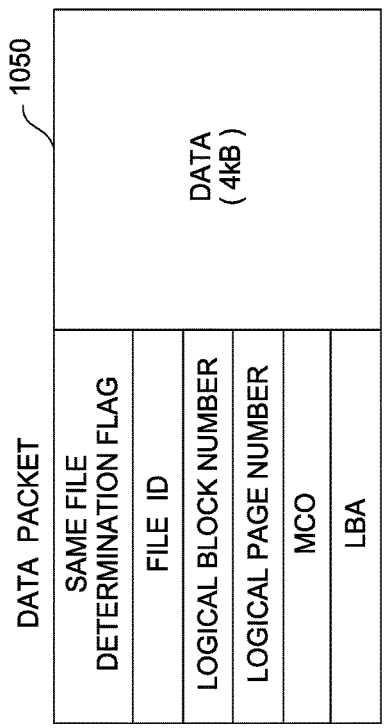
FIG. 17 illustrates a structure of a data packet according to the second embodiment.

Next, a configuration of a data packet 1050 will be described with reference to FIG. 17.

The data packet generation unit 600 generates a data packet 1050 by adding a header to the data received from the reception control unit 300 for each cluster, and then, stores the data packet 1050 in the buffer 30.

Information for controlling by the NAND management unit 700 is stored in the header.

The LBA is a logical address in a sector unit (for example, 512B) designated by the write command, and indicates the LBA of the first sector of the data stored in the data packet 1050.

As described above, the logical block number, the logical page number, and the MCO indicate which cluster 1020 of which NAND-type flash memory 22 the data stored in the data packet 1050 are to be written in.

The same file determination flag and the file ID indicates which same file command group the write command belongs to, when the data stored in the data packet 1050 are written in response to the write command.

Figure 18:
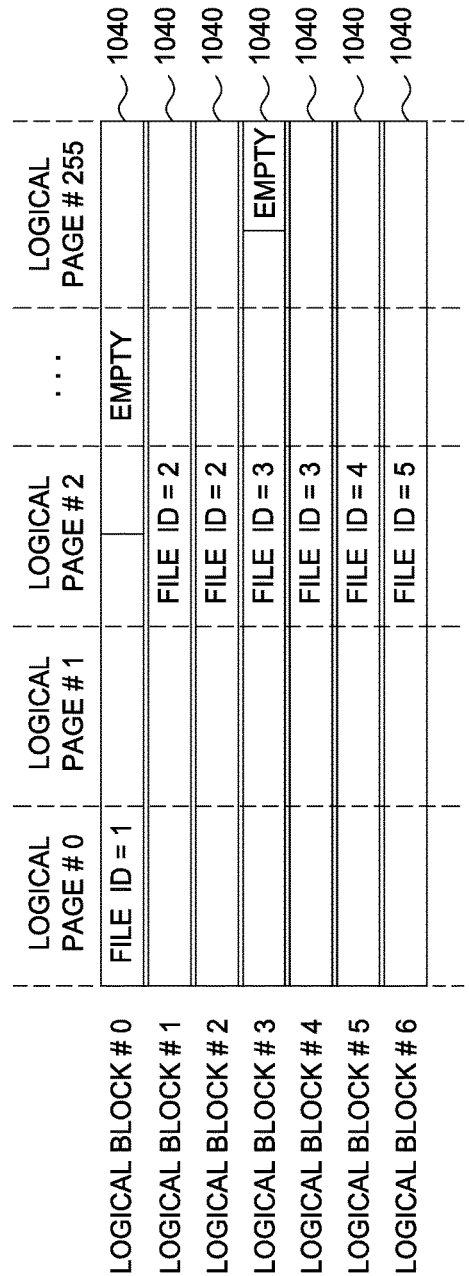
FIG. 18 illustrates a file ID assigned to each logical block according to the second embodiment.

Next, an example of a file ID assigned to each logical block 1040 when the storage device 1 according to the present embodiment writes the data configuring the same files into the nonvolatile storage 20, will be described with reference to FIG. 18.

As described above, since data having the same file ID is assumed to configure the same file, all data of the file are highly likely to be erased at once. According to the present embodiment, the data having a plurality of file IDs is not written into the logical block 1040 which is a unit for the controller 10 to erase the data. That is, the plurality of file IDs are not assigned to each of the logical blocks #0 to #6.

On the other hand, one file ID may be assigned to a plurality of logical blocks 1040 just like file ID=2 is assigned to the logical blocks #1 and #2. In addition, when the data configuring the same file such as the logical blocks #0 and #4 does not fill the entire region of the logical block 1040, zero data are written into an empty space.

Figure 19:
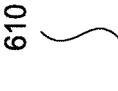
FIG. 19 illustrates a structure of a logical block management table according to the second embodiment.

Next, an example of a configuration of the logical block management table 610 implemented in the data packet generation unit 600 according to the present embodiment will be described with reference to FIG. 19.

The logical block management table 610 manages for each logical block 1040 the file ID and a tag of the command corresponding to the file ID. The logical block 1040 and the file ID in FIG. 19 correspond to those illustrated in FIG. 18.

File ID=1 is assigned to the logical block #0 and the tag of the command corresponding to this file ID is 0x0001.

File ID=2 is assigned to the logical block #1 and the logical block #2, and two commands having tag=0x0002 and tag=0x0003 correspond to this file ID.

File ID=3 is assigned to the logical block #3 and the logical block #4, and two commands having tag=0x0004 and tag=0x0005 correspond to this file ID.

File ID=4 is assigned to the logical block #5, and three commands having tag=0x0006, tag=0x0007, and tag=0x0008 correspond to this file ID.

File ID=5 is assigned to the logical block #6, and two commands having tag=0x0009 and tag=0x000A correspond to this file ID.

Figure 20:
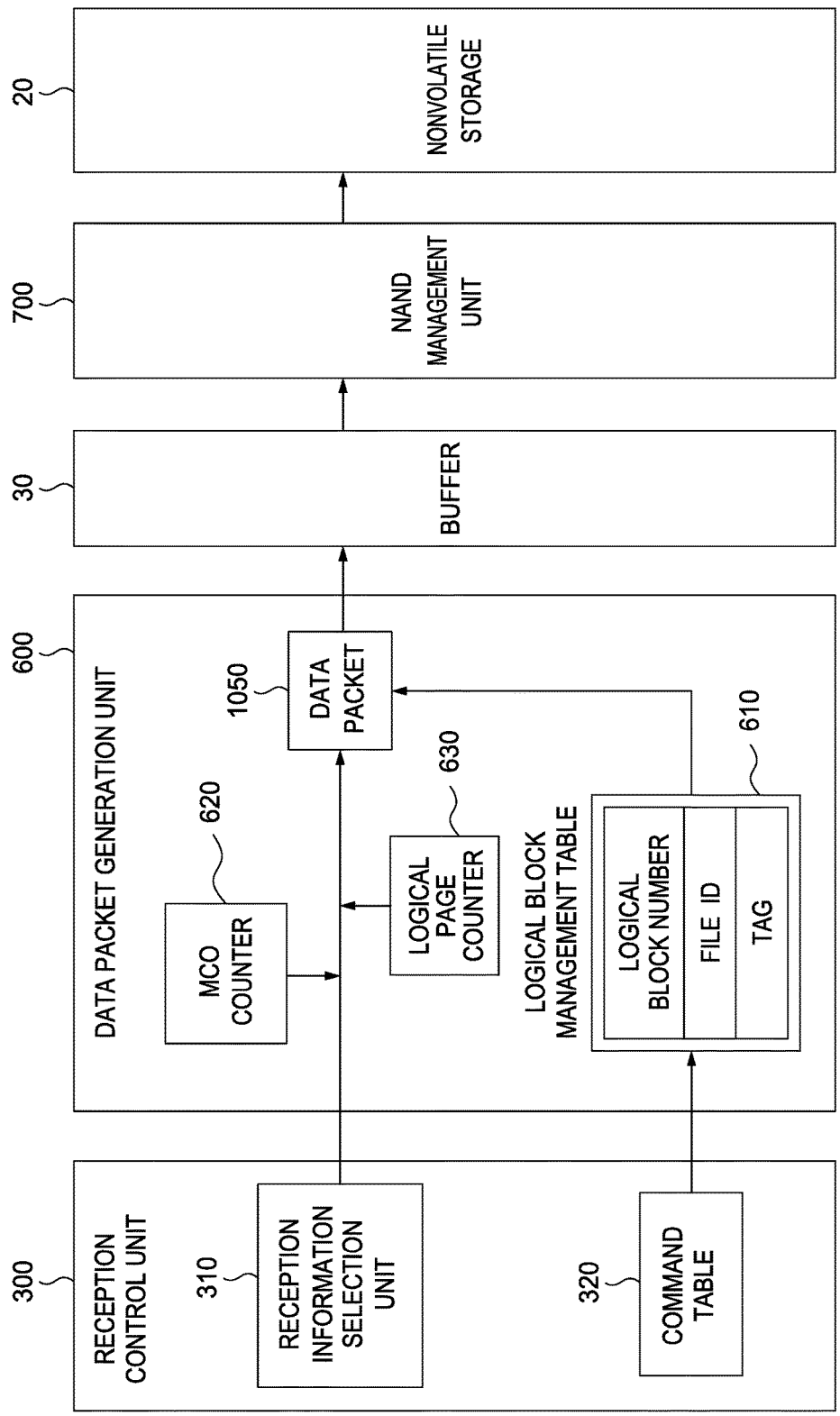
FIG. 20 illustrates an operation of a data packet generation unit according to the second embodiment.

Next, an operation of the data packet generation unit 600 according to the present embodiment will be described with reference to FIG. 20.

The CPU 200 extracts the COMMAND frame from the command table 320, and registers the file ID, the tag, and the logical block number corresponding to those in the logical block management table 610. Thereafter, a DATA frame is transmitted from the host 2, and then, the data packet generation unit 600 that received the DATA frame from the reception control unit 300 searches the logical block management table 610 with the tag in a header of the DATA frame as an index, and acquires the logical block number and the file ID. In addition, the data packet generation unit 600 searches the command table with the tag as the index and acquires the LBA.

The data packet generation unit 600 divides the data in the DATA frame by the packet size (4 kB) and increments an MCO counter 620 and a logical page counter 630, and then, checks the MCO and the logical page number of the packet using the counters. The data packet generation unit 600 generates the data packet 1050 using these information and stores the data packet 1050 in the buffer 30.

A NAND management unit 700 that reads the data packet 1050 from the buffer 30 can write the data packet 1050 into the appropriate cluster 1020 in the NAND-type flash memory Ch0 to Ch17 using the header information of the data packet 1050.

According to the storage device according to the second embodiment described above, since the data determined to configure the same file is written into one logical block, which is a unit for erasing the data at once, the number of erasures is reduced. As a result, it is possible to improve the performance of the storage device.

Third Embodiment

The storage device according to the first embodiment determines whether or not the command belongs to the same file command group based on the LBA range of the received command. The storage device according to a third embodiment is further directed to improving the performance of the storage device by changing the control of executing the read command belonging to the same file command group.

Figure 21:
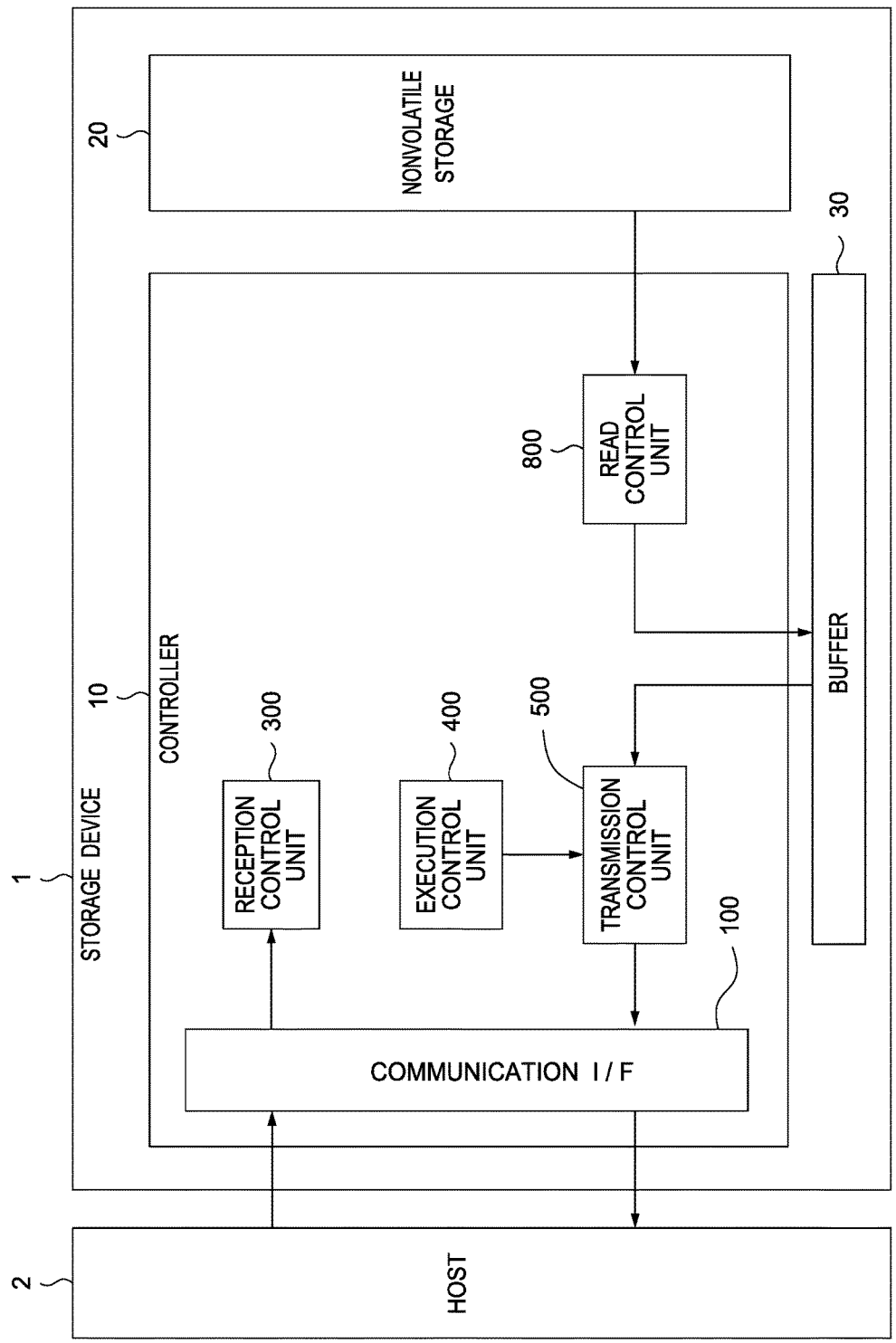
FIG. 21 is a block diagram of a storage device according to a third embodiment.

FIG. 21 is a block diagram of a storage device 1 according to the third embodiment. In the description below, description for a functional block necessary for writing the data into the nonvolatile storage 20 is omitted.

In addition to the configuration of the controller 10 according to the first embodiment, the controller 10 according to the present embodiment includes a read control unit 800. The read control unit 800 has a function of storing the data read from the nonvolatile storage 20 in the buffer 30 based on the address and the number of transfers designated by the CPU 200 executing FW.

Next, an example of dividing the commands when the data configuring one file is read by a plurality of commands will be described with reference to FIG. 22.

Figure 22:
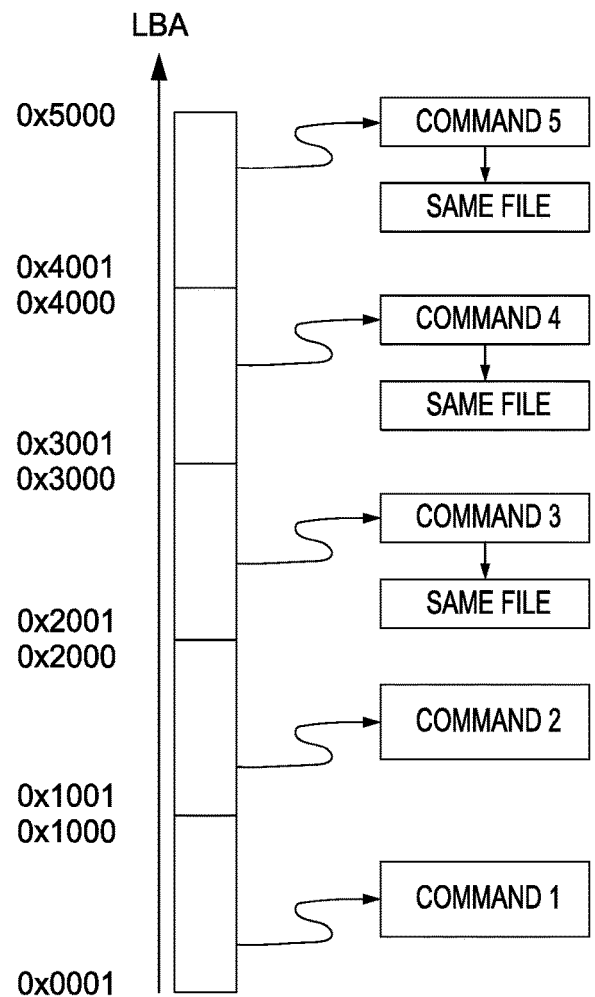
FIG. 22 illustrates an example of commands received by the storage device according to the third embodiment.

As illustrated in FIG. 22, one file includes the data items stored in the LBA=0x0001 to 0x5000. In addition, the host 2 issues five commands (the number of transfers of the commands is 0x1000 respectively) for reading the file, those are: command 1 of LBA=0x0001, command 2 of LBA=0x1001, command 3 of LBA=0x2001, command 4 of LBA=0x3001, and command 5 of LBA=0x4001.

At this time, as described in the first embodiment, the sequential determination unit 330 determines that the command 3 to command 5 belong to the same file command group, and the command 3 to command 5 are stored in the command table 320 with the same file determination flag being added.

The CPU 200 that has extracted information on each command from the command table 320 instructs the read control unit 800 to read the data from the nonvolatile storage 20 as described below.

That is, as described with reference to FIG. 23, with regard to the command 1 and command 2, the data for the number of transfers designated by the command from the start LBA designated by the command is read from the nonvolatile storage 20 and stored in the buffer 30. Thereafter, the data stored in the buffer 30 are transmitted to the host 2.

On the other hand, with regard to the command 3 to which the same file determination flag is set, after the data for the number of transfers designated by the command from the start LBA designated by the command, that is, after the data stored in the LBA=0x2001 to 0x3000 is read from the nonvolatile storage 20 and stored in the buffer 30, the data stored in the address other than the above-described LBA range are also read from the nonvolatile storage 20 and stored in the buffer 30. As described above, hereinafter, the operation of reading the data stored in the addresses other than the address range designated by the command and storing the data in the buffer 30 is referred to as "pre-reading".

It is preferable that the start address for pre-reading to be performed along with the reception of the command 3 is continuous with the last LBA designated by the command 3, that is LBA=0x3001. The reason is because the same file determination flag is added to the command 3 and the possibility of receiving the commands subsequent to LBA=0x3001 is high in order to read the same file.

Here, any address within the gap determination threshold value from the last LBA may be the start address, not an address completely continuous with the last LBA designated by the command 3. Furthermore, the pre-reading may be performed with an address smaller than the start LBA designated by the command 3, that is, the start address having the LBA smaller than 0x2000.

An amount of data stored in the buffer 30 through the pre-reading may be a constant amount or may be a transfer amount (when the pre-reading is performed along with the reception of the command 3, the amount is 0x1000 sectors) of the data designated by the pre-reading target command. In addition, the amount may be changed according to the capacity of free spaces of the buffer 30.

Figure 23:
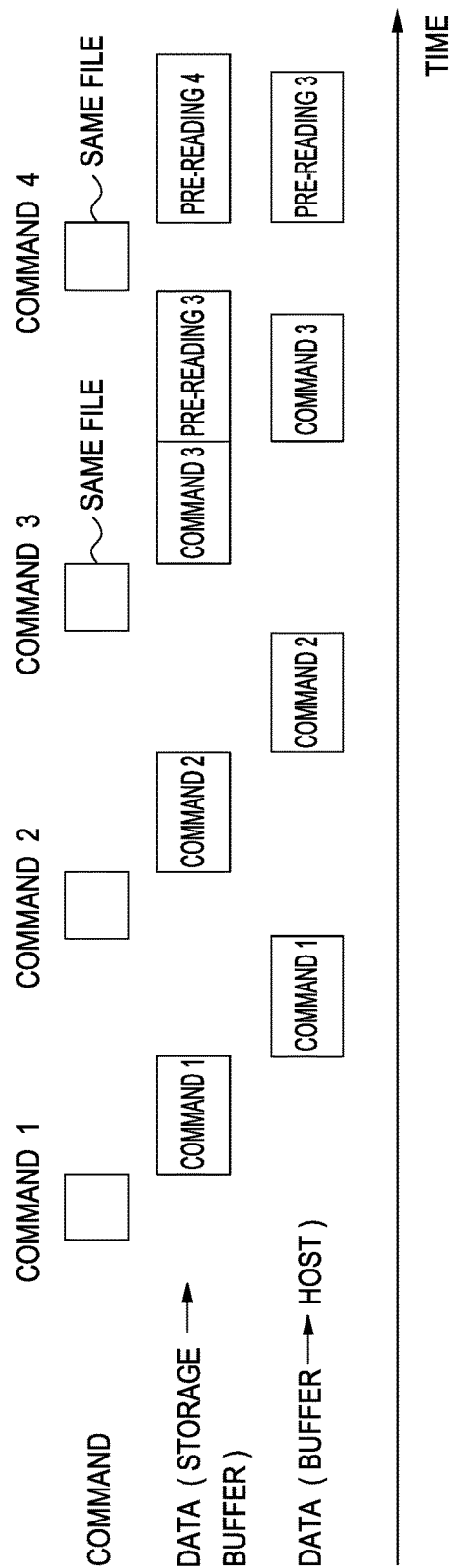
FIG. 23 illustrates a pre-reading operation according to the third embodiment.

In FIG. 23, the data stored in the LBA=0x3001 to 0x4000 are pre-read along with the reception of the command 3, and stored in the buffer 30. Subsequently, the command 4 is received. Since the targeted data of the command 4 are already stored in the buffer 30, after receiving the command 4, the targeted data of the command 4 can be transmitted to the host 2 without waiting for the data to be stored in the buffer 30 from the nonvolatile storage 20.

Also, since the same file determination flag is also added to the command 4, the pre-reading can be performed on the data stored in the address other than the range of addresses designated by the command 4.

Figure 24:
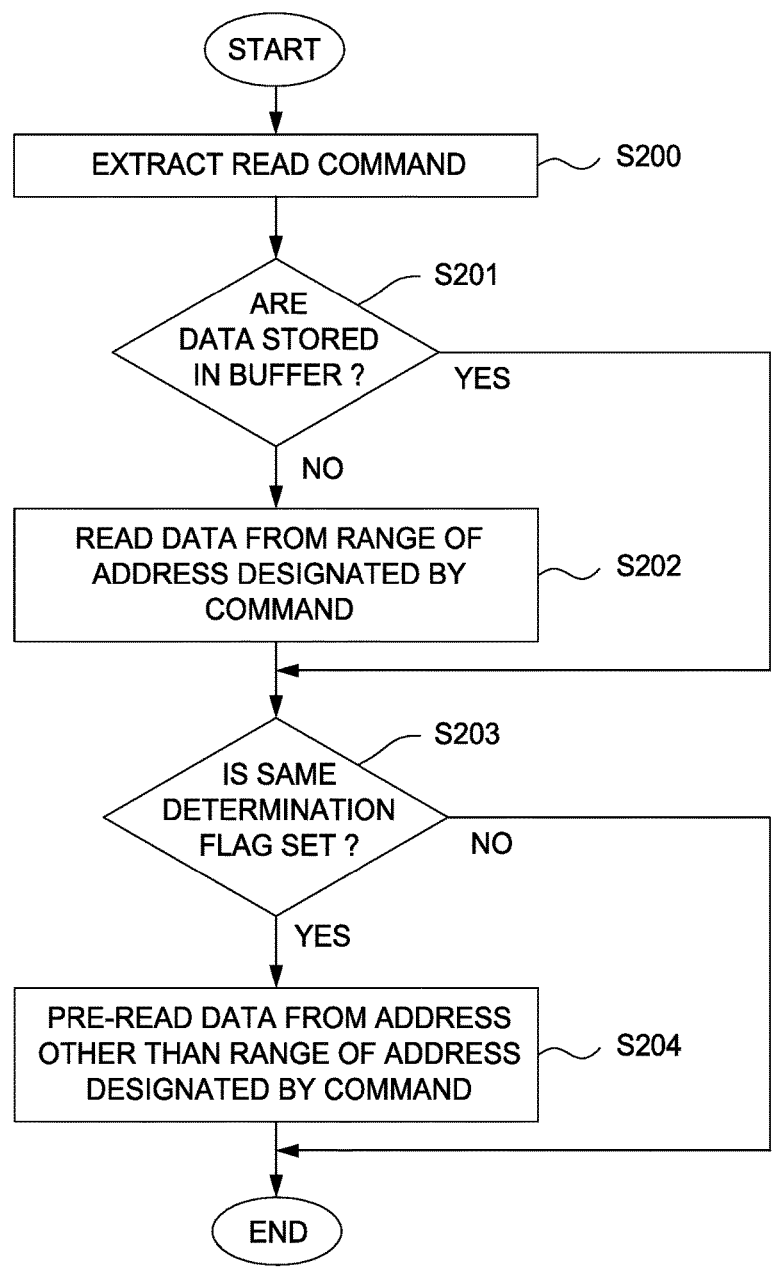
FIG. 24 is a flowchart illustrating a control in accordance with firmware according to the third embodiment.

Next, an operation in accordance with FW when extracting the read command from the command table 320 according to the present embodiment will be described with reference to FIG. 24.

The CPU 200 that has extracted the read command determines whether or not the targeted data have been already stored in the buffer 30 (S201). If the data have not been stored yet (No in S201), the CPU 200 instructs the read control unit 800 to store the data stored within the range of addresses designated by the command in the buffer 30 (202).

Next, the CPU 200 determines whether or not the same file determination flag has been set (S203). If the flag has been set (Yes in S203), the CPU 200 instructs the read control unit 800 to perform pre-reading on the data stored in the addresses other than the range of addresses designated by the command, and store the pre-read data in the buffer 30 (S204).

According to the storage device according to the third embodiment described above, since a part of the data determined to configure the same file can be stored in the buffer in advance before receiving the read command, it is possible to improve the performance of the storage device.

According to the storage device according to at least one of the embodiments described above, whether or not the received command is a command to access the data configuring the same file is determined according to the LBA range of the received command. As a result, the execution of the command can appropriately be controlled, and thus, it is possible to improve the performance of the storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a nonvolatile memory including a plurality of blocks; and
   a controller configured to:
   retain a logical address range designated by each of a plurality of write commands that were received, and
   upon each gap of two adjacent logical address ranges of two or more of the write commands being smaller than a first threshold and an entire length of the logical address ranges of said two or more write commands being larger than a second threshold, write data corresponding to one of said two or more write commands in one of the blocks of the nonvolatile memory, as a part of a single data group comprising data corresponding to each of said two or more write commands, such that data that do not form the single data group are not written in said one of the blocks of the nonvolatile memory.

2. The storage device according to claim 1, wherein
   the controller is further configured to manage a command management table having a plurality of entries each of which includes a total length of one or more logical address ranges designated by one or more of the plurality of write commands and a flag, wherein
   when each gap of two adjacent logical address ranges is smaller than the first threshold, corresponding write commands are managed in a single entry of the command management table, and
   when an entire length of the logical address ranges in the single entry is larger than the second threshold, the flag is activated in the entry.

3. The storage device according to claim 2, wherein
   the controller carries out a write operation in accordance with the plurality of write commands, referring to the command management table.

4. The storage device according to claim 1, wherein
   the controller is further configured to generate a data packet based on the data corresponding to said one of said two or more write commands, the data packet including an identifier of the single data group, and write the generated data packet in said one of the blocks of the nonvolatile memory.

5. The storage device according to claim 1, wherein
   the controller is further configured to manage a block management table having a plurality of entries each of which includes an identifier of a block and an identifier of a data group stored therein.

6. The storage device according to claim 1, further comprising:
a buffer, wherein
the controller is further configured to:
retain a logical address range designated by each of a plurality of read commands that were received, and
upon each gap of two adjacent logical address ranges of two or more of the read commands being smaller than a third threshold and an entire length of the logical address ranges of said two or more read commands being larger than a fourth threshold, read data from a logical address range designated by one of said two or more read commands to the buffer by executing said one of the read commands, and then read data from one of the logical address ranges subsequent to the read logical address range to the buffer before executing a read command corresponding thereto.

7. The storage device according to claim 6, wherein
the controller is further configured to transmit the data stored in the buffer to an external device by executing said one of said two or more read commands concurrently with reading the data from said one of the logical address ranges subsequent to the read logical address range.

8. The storage device according to claim 6, wherein
the controller is further configured to manage a second command management table having a plurality of entries each of which includes a total length of one or more logical address ranges designated by the plurality of read commands and a flag, wherein
when each gap of two adjacent logical address ranges of the plurality of read commands is smaller than the third threshold, corresponding read commands are managed in a single entry of the second command management table, and
when an entire length of the logical address ranges in the single entry of the second command management table is larger than the fourth threshold, the flag is activated in the entry of the second command management table.

9. The storage device according to claim 8, wherein
the controller carries out a read operation in accordance with the plurality of read commands, referring to the second command management table.

10. A storage device comprising:
a nonvolatile memory;
a buffer; and
a controller configured to:
retain a logical address range designated by each of a plurality of read commands that were received, and
upon each gap of two adjacent logical address ranges of two or more of the read commands being smaller than a first threshold and an entire length of the logical address ranges of said two or more read commands being larger than a second threshold, read data from a logical address range designated by one of said two or more read commands to the buffer by executing said one of the read commands, and then read data from one of the logical address ranges subsequent to the read logical address range to the buffer before executing a read command corresponding thereto.

11. The storage device according to claim 10, wherein
the controller is further configured to transmit the data stored in the buffer to an external device by executing said one of said two or more read commands concurrently with reading the data from said one of the logical address ranges subsequent to the read logical address range.

12. The storage device according to claim 10, wherein
the controller is further configured to manage a command management table having a plurality of entries each of which includes a total length of one or more logical address ranges designated by the plurality of read commands and a flag, wherein
when each gap of two adjacent logical address ranges of the plurality of read commands is smaller than the first threshold, corresponding read commands are managed in a single entry of the command management table, and
when an entire length of the logical address ranges in the single entry of the command management table is larger than the second threshold, the flag is activated in the entry of the command management table.

13. The storage device according to claim 12, wherein
the controller carries out a read operation in accordance with the plurality of read commands, referring to the command management table.

14. A method of operating a storage device having a nonvolatile memory including a plurality of blocks, comprising:
retaining a logical address range designated by each of a plurality of write commands that were received; and
upon each gap of two adjacent logical address ranges of two or more of the write commands being smaller than a first threshold and an entire length of the logical address ranges of said two or more write commands being larger than a second threshold, writing data corresponding to one of said two or more write commands in one of the blocks of the nonvolatile memory, as a part of a single data group comprising data corresponding to each of said two or more write commands, such that data that do not form the single data group are not written in said one of the blocks of the nonvolatile memory.

15. The method according to claim 14, further comprising:
managing a command management table having a plurality of entries each of which includes a total length of one or more logical address ranges designated by one or more of the plurality of write commands and a flag, wherein
when each gap of two adjacent logical address ranges is smaller than the first threshold, corresponding write commands are managed in a single entry of the command management table, and
when an entire length of the logical address ranges in the single entry is larger than the second threshold, the flag is activated in the entry.

16. The method according to claim 14, further comprising:
maintaining a block management table having a plurality of entries each of which includes an identifier of a block and an identifier of a data group stored therein.

17. The method according to claim 14, further comprising:
retaining a logical address range designated by each of a plurality of read commands that were received; and
upon each gap of two adjacent logical address ranges of two or more of the read commands being smaller than a third threshold and an entire length of the logical address ranges of said two or more read commands being larger than a fourth threshold, reading data from a logical address range designated by one of said two or more read commands to the buffer by executing said one of the read commands, and then read data from one of the logical address ranges subsequent to the read logical address range to the buffer before executing a read command corresponding thereto.

18. The method according to claim 17, further comprising:
transmitting the data stored in the buffer to an external device by executing said one of said two or more read commands concurrently with reading the data from said one of the logical address ranges subsequent to the read logical address range.

19. The method according to claim 17, further comprising:
managing a second command management table having a plurality of entries each of which includes a total length of one or more logical address ranges designated by the plurality of read commands and a flag, wherein
when each gap of two adjacent logical address ranges of the plurality of read commands is smaller than the third threshold, corresponding read commands are managed in a single entry of the second command management table, and
when an entire length of the logical address ranges in the single entry of the second command management table is larger than the fourth threshold, the flag is activated in the entry of the second command management table.

* * * * *